Oct. 29, 1929.　　　　B. W. ROGERS　　　　1,733,469
REENFORCED SHEET RUBBER
Filed Nov. 22, 1927
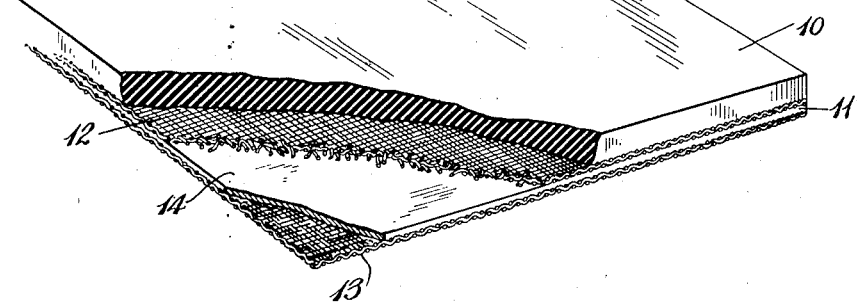
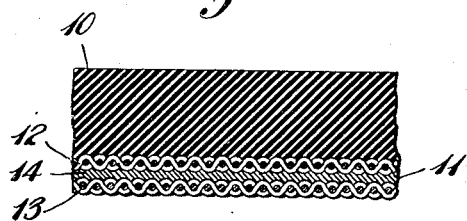
Inventor
Bruce W. Rogers
By Pierson, Eakin & Avery
Attys.

Patented Oct. 29, 1929

1,733,469

UNITED STATES PATENT OFFICE

BRUCE W. ROGERS, OF AKRON, OHIO, ASSIGNOR TO THE B. F. GOODRICH COMPANY, OF NEW YORK, N. Y., A CORPORATION OF NEW YORK

REENFORCED SHEET RUBBER

Application filed November 22, 1927. Serial No. 234,974.

This invention relates to sheet rubber having a suitable backing for attaching it to a support for purposes such as resisting abrasion in the handling of materials. Rubber linings of abrasion-resisting rubber compounds are finding useful application for the lining of chutes, guide-ways, etc., for conducting or conveying material of various kinds including crushed stone, coal, cement, ceramic and other materials, whose passage over conducting surfaces would cause rapid abrasion and wear when such surfaces are composed of wood, metal or the like.

Difficulty has heretofore been encountered in providing a suitable backing for the wear-resisting rubber layer in a sheet material of this class. The backing should be sufficiently flexible to lie conformably on the supporting surface, which is sometimes curved or not perfectly flat, and to be rolled up on occasion for storage and transportation, so that the material can be made in relatively great widths and long lengths for the sake of economical production and utilization. The backing should at the same time be sufficiently stiff to avoid buckling of the material when fastened in place, to economize in the number of fasteners required per unit of length or area, and to avoid the tendency of the heads of the fasteners, such as nails, bolts, screws or the like, to pull through the backing when driven down into or through the rubber facing layer.

Various types of backing for this purpose have heretofore been employed such as metal, cloth, or semi-hard fiberized rubber compounds more or less firmly united to the rubber facing layer. None of these prior forms of backing has proved completely satisfactory and all have been lacking in the desired combination of qualities furnished by my present invention, the characteristics of which are hereinafter set forth in detail.

Of the accompanying drawings, Fig. 1 is a perspective view partly broken away and in section, showing abrasion-resisting sheet-rubber material provided with an attaching backing in accordance with a preferred embodiment of my invention.

Fig. 2 is a cross-section of the laminated structure on a larger scale.

In the drawings, 10 is the facing layer of substantial thickness which may consist of a tough, wear-resisting, vulcanized, soft-rubber compound of about the same character as used on conveyor belts. The backing 11 is preferably in three layers comprising a woven fabric layer 12 of heavy canvass or duck frictioned with rubber and intimately united with the facing layer 10 by vulcanization, a similar woven-fabric, rubber-frictioned layer 13 on the external bottom face of the structure, and an intermediate layer 14 of rubber compound which is stiffened with cotton or other fiber, mineral fillers, etc., commonly known as fiberized rubber or fiber stock. All of these layers are intimately adhered together by pressure and heat during the vulcanizing process. The resulting structure is an abrasion-resisting, sheet-rubber material having an attachment backing which combines for the first time, so far as I am aware, all of these qualities which are most desirable in a material for the intended use. It can be fabricated according to methods employed in belt making and vulcanized in long lengths and full fabric widths in a belt press. It may then be rolled up and thus economically stored or shipped in rolls and readily cut to the desired sizes and shapes for use. The combination of stiff or semi-hard fiberized rubber, together with fabric in the backing affords that combination of flexibility and stiffness which will permit this rolling up of the material and also cause it to lie conformably and without buckling on straight or curved supporting surfaces while at the same time the backing offers sufficient resistance to the passage of the heads of the nails, bolts or other fasteners whose shanks are passed or driven through the material and their heads partially or completely embedded in the rubber layer 10. The inner fabric layer 11 adheres perfectly to the rubber facing layer 10 on the one side and the fiberized rubber layer 14 on the other, and the fabric layer 13 in like manner adheres perfectly to the layer 14. The stiff, vulcanized rubber layer 14 is not subject to cracking as heretofore experienced when it has been attempted to provide a backing of fiberized, stiff rubber alone of sufficient thickness to act as an attaching layer, and it has better adhesion to the fabric than is readily obtainable directly between fiber stock and rubber compound of the facing layer 10.

The described embodiment may be more or less varied without departing from the scope of my invention. For example, the bottom layer of fabric 13 could be omitted, either with or without the addition of an equivalent thickness to the layer of fiber stock 14.

I claim:

1. Laminated sheet material comprising layers united by vulcanization and including a facing layer of abrasion-resisting, soft-rubber compound and a flexible backing which includes a layer of woven fabric next to the facing layer and a layer of relatively-stiff, semi-hard, rubber compound next to said fabric layer.

2. Laminated sheet material comprising layers united by vulcanization and including a facing layer of abrasion-resisting, soft-rubber compound, and a flexible backing consisting of inner and outer layers or woven fabric and an interposed layer of relatively-stiff, fiberized rubber compound.

In witness whereof I have hereunto set my hand this 21st day of November, 1927.

BRUCE W. ROGERS.